April 21, 1964   C. E. STRAKA   3,129,723
HOT AND COLD WATER CONTROL SYSTEM
Filed Nov. 2, 1961
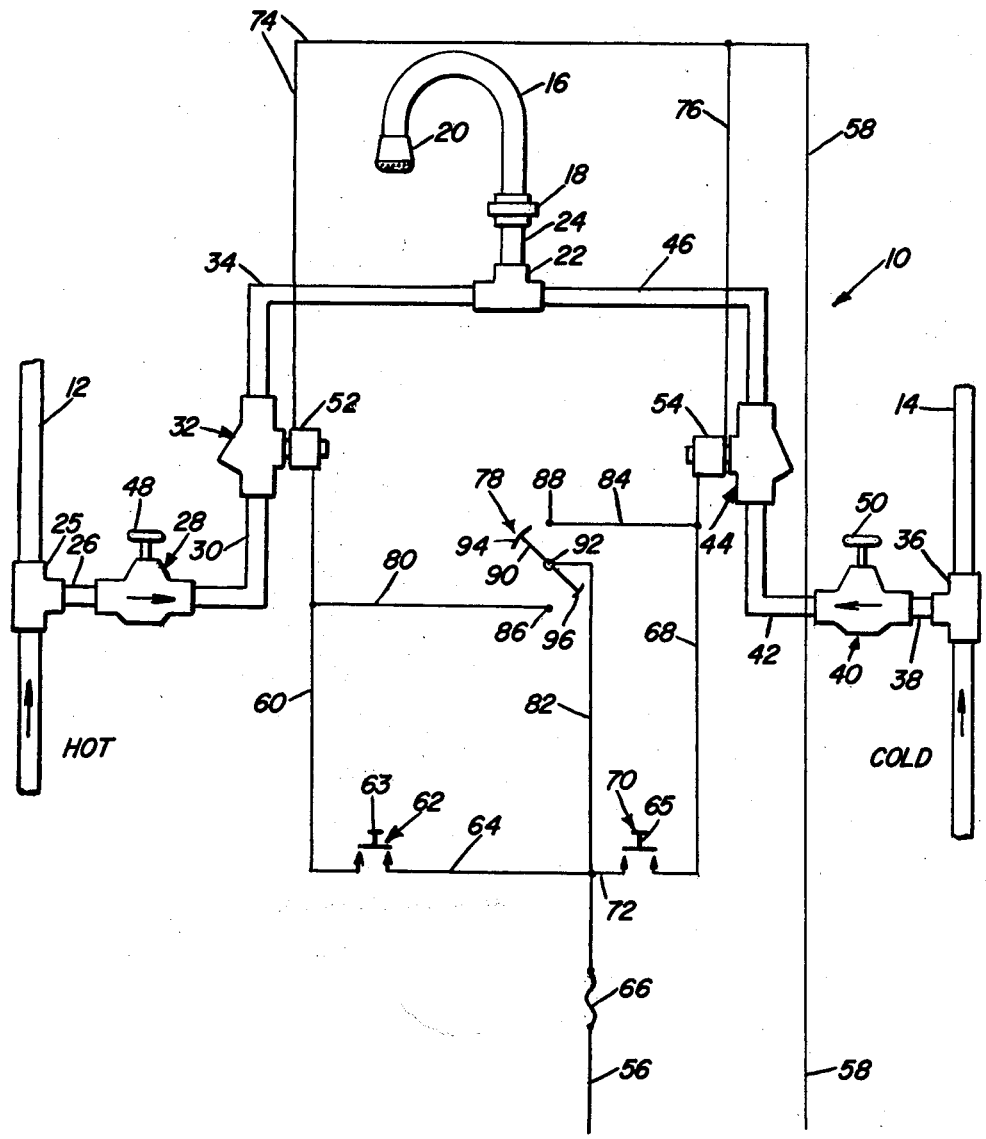
Charles E. Straka
INVENTOR.

United States Patent Office 3,129,723
Patented Apr. 21, 1964

3,129,723
HOT AND COLD WATER CONTROL SYSTEM
Charles E. Straka, 1007 E. 5th St., West Frankfort, Ill.
Filed Nov. 2, 1961, Ser. No. 149,696
1 Claim. (Cl. 137—607)

This invention relates to fluid flow control systems, and particularly to a system for controlling the water and the temperature thereof through the spigot of a conventional bathroom lavatory.

Briefly, the invention comprises a first and second electrically operated control valve each located in the hot or cold water pipe leading to a lavatory spigot with foot and hand control switches for selectively or simultaneously operating each of the valves.

Accordingly, it is a primary object of the invention to provide a system of remotely controlled valves whereby an operator may more efficiently and more easily operate the valves by remote control means.

It is another object of the invention to provide foot operated means for controlling the valves of a lavatory thereby leaving the hands of the operator free for other purposes.

It is another object of the invention to provide foot operated valves for a lavatory whereby the flow of water may be easily controlled by children and the foot operated control means automatically cut-off the flow of water as soon as the operator thereof removes his foot therefrom.

It is another object of the invention to provide a hot and cold water control system which eliminates the old style, steel, hand operated valves with the attendant leaks, drips and necessity for changing the seals, gaskets, corroded stems, etc.

It is another object of the invention to provide a hot and cold water control system whereby the operator may control the flow of water and temperature thereof by a single hand operated valve.

It is another object of the invention to provide a hot and cold water control system which is relatively simple in design, economical to manufacture, durable in use and requires a minimum of maintenance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

A schematic diagram of my hot and cold water control system is shown in the single figure of the drawings.

As shown in the drawings, the hot and cold water control system 10 includes a conventional hot water pipe 12 and cold water pipe 14 with the water therein being under pressure. Preferably, the water is continuously circulating through the pipe 12 to a source of heat so as to always maintain the water in the pipe at a relatively high temperature.

The control system 10 is primarily designed for a lavatory, however, it could be used with washtubs, showers, etc. The outlet for the control system comprises a spigot 16 pivotally mounted on a pivot joint 18 and provided at its outlet nozzle with an aerator 20 to prevent splashing of the water as it hits the sink or basin therebelow. The swivel joint 18 is connected to a T-fitting 22 by means of a pipe 24.

The T-fitting 22 is connected to the hot water pipe by means of a short pipe 26, a hand operated valve 28, a pipe 30, an electrically operated valve 32 and a pipe 34. The T-fitting 22 is connected to the cold water pipe 14 by means of a T-fitting 36, pipe 38, hand operated valve 40, pipe 42, a solenoid operated valve 44, and pipe 46.

The hand operated valves 28 and 40 are of conventional design and each is provided with a manually rotated conventional handle 48 and 50, respectively. The valves are normally closed by spring means, not shown, and each is opened by a conventional electrical solenoid 52 and 54.

The solenoids 52 and 54 are energized by the voltage or potential between the input power lines 56 and 58. The solenoid 52 is connected to the power line 56 by means of a conductor 60, a foot operated switch 62 and a conductor 64. A conventional fuse 66 is provided in the line 56 for obvious safety reasons.

The solenoid 54 is connected to the power line 56 by means of a conductor 68, a foot operated switch 70 and a conductor 72.

The solenoids 52 and 54 are connected to the power line 58 by means of conductors 74 and 76.

Either of the solenoids 52 or 54 may be operated by a hand operated switch assembly 78. The solenoid 52 is connected to the power line 56 through a hand operated circuit parallel to the foot operated circuit, and this hand operated circuit comprises a conductor 80, hand operated switch 78 and conductor 82. Likewise the solenoid 54 is connected to the power line 56 by a circuit in parallel to the circuit including the foot operated switch 70. This parallel circuit includes the conductor 82, the hand operated switch 78 and the conductor 84.

The switch 78 is a four position switch. It includes two fixed contacts 86 and 88 at the ends of the leads 80 and 84. The switch 78 further includes a rotatable brush support 90 which is rotatable about a fixed pivot 92 connected by a conventional brush to the upper end of the lead 82. Secured to one end of the brush support 90 is a relatively long arcuate brush 94. Secured to the other end of the brush support 90 is a smaller or shorter arcuate brush 96. The center of the brush support 90 includes a shaft concentric with the pivot 92 having a handle on one end for rotating the support 90 and the brushes thereon. Preferably, an indicator is also provided with the handle. The handle and indicator being conventional, they are not shown in the drawings.

The switch 78 being a four-way switch may be operated to any one of four positions. As shown in the drawings, the switch is in the "off" position. The switch has three "on" positions. If the switch is rotated slightly clockwise as viewed in the drawings, the right end of the brush 94 will touch the contact 88 thereby energizing the solenoid 54 for opening the valve 44 for permitting flow of cold water through the aerator nozzle 20. If the support 90 is rotated slightly further clockwise, then the brush 96 will touch the contact 86 while the brush 94 still remains in contact with the contact 88. In this third position, both of the solenoids 52 and 54 are energized for opening both valves 32 and 44 thereby permitting both hot and cold water to flow to spigot 16. This mixture of hot and cold water will produce a flow of warm water through the nozzle 20. The switch may be moved to a fourth position by rotating it in a counterclockwise direction from the position as shown in the drawings whereby the lowermost end of the brush 94 will just make contact or touch the contact 86 without the brush 96 touching the contact 88. This will cause the solenoid 52 to be energized for admitting hot water to the nozzle 20.

The valve 32 and 44 may alternatively be operated by the foot control switches 62 and 70. Normally these switches are opened by spring means, not shown. If the foot pedal 63 is pushed down to close the switch 62, the solenoid 52 will be energized for opening the valve 32 for admitting hot water to the nozzle 20. In a like manner, if the foot pedal or switch 70 is pushed down, the valve 44 will be opened for admitting cold water to the nozzle 20. Of course, both switches 62 and 70 may be closed simultaneously for opening both valves 32 and 44 thereby causing warm water to flow from the nozzle 20.

It is to be noted that the valves 32 and 44 are both conventional as are the solenoids 52 and 54. The solenoids 52 and 54 each contain springs for normally maintaining the valves closed. When the solenoids are energized, the magnetic force thereof overcomes these springs and opens the valves. The valves automatically close when the solenoids are deenergized.

Conventional hand operated valves 28 and 40 are provided between the solenoid valves and the supply pipes. By opening these valves, to the desired position the rate of flow through the pipes 34 and 46 is regulated to the desired amount. Also, the temperature of the warm water flowing through nozzle 20 when both valves 32 and 44 are opened may be regulated by the valves 28 and 40.

The foot operated switches 62 and 70 would normally be located on the floor below the washbasin, while the hand operated switch 78 would normally be located on top of or above the washbasin.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A water control system comprising a hot water supply, a cold water supply, an outlet, first conduit means including a solenoid controlled valve connecting said hot water supply to said outlet, second conduit means including a second solenoid controlled valve connecting said cold water supply to said outlet, foot operated control means operatively connected to said first and second solenoid controlled valves comprising first and second switches each connected in series with a different one of said solenoids, hand operated control means operatively connected to said first and second solenoid controlled valves and located above said foot operated control means, including rotatable switch means for rendering operative each of said solenoids by two circuits each of which are in parallel with one of the foot operated switch circuits, said switch means including contact means for rendering operative said first solenoid upon rotation of said switch means in one direction from an off position by connecting one of said circuits to said first solenoid, continued rotation of the switch means in the same direction rendering operative said first and second solenoids simultaneously by connecting the remaining circuit to said second solenoid and rotation of said switch means in the opposite direction from said off position rendering operative said second solenoid alone by connecting the other of said circuits to said second solenoid.

References Cited in the file of this patent

UNITED STATES PATENTS

| | | |
|---|---|---|
| 1,103,756 | Gebhardt | July 14, 1914 |
| 2,146,930 | Bassett | Feb. 14, 1939 |
| 2,402,280 | Green | June 18, 1946 |
| 2,790,632 | Mellette | Apr. 30, 1957 |
| 2,908,017 | Whaley | Oct. 13, 1959 |

FOREIGN PATENTS

| | | |
|---|---|---|
| 868,877 | Germany | Mar. 2, 1953 |
| 1,104,450 | Germany | Apr. 6, 1961 |